Figure 1:
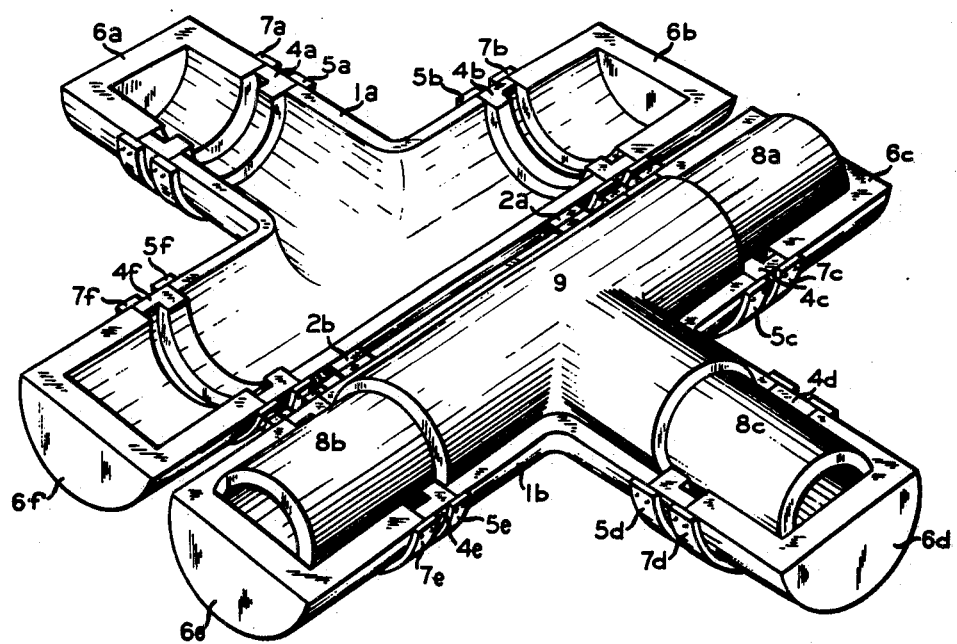

United States Patent [19]

Scott, Jr. et al.

[11] 4,129,282

[45] Dec. 12, 1978

[54] MOLD APPARATUS

[75] Inventors: John N. Scott, Jr.; Guy E. Carrow, both of Bartlesville, Okla.

[73] Assignee: Phillips Petroleum Company, Bartlesville, Okla.

[21] Appl. No.: 849,682

[22] Filed: Nov. 8, 1977

Related U.S. Application Data

[62] Division of Ser. No. 699,829, Jun. 25, 1976, Pat. No. 4,076,282, which is a division of Ser. No. 599,738, Jul. 28, 1975, Pat. No. 3,989,787.

[51] Int. Cl.² ............................................. B29C 5/00
[52] U.S. Cl. ...................................... 249/137; 249/79; 425/429
[58] Field of Search ................. 249/137, 79; 425/429, 425/435

[56] References Cited

U.S. PATENT DOCUMENTS

| | | | |
|---|---|---|---|
| 3,217,078 | 11/1965 | Kleiber | 425/429 X |
| 3,350,745 | 11/1967 | Schott et al. | 425/429 X |
| 3,843,285 | 10/1974 | Nitta et al. | 425/429 X |

*Primary Examiner*—J. Howard Flint, Jr.

[57] ABSTRACT

A mold apparatus for forming a molded article comprising a hollow body of a crosslinked polymer rotationally molded around a section of at least one piece of non-crosslinked conduit, which conduits protrude from said hollow body, made by attaching said conduits of non-crosslinked material at the desired location to the mold with said section being located inside a heated section of the mold so that the crosslinkable polymer during a rotational molding process is fused and crosslinked inside of the mold and around and in tight welding-type connection with said section, whereas the remainder of the piece or pieces of uncrosslinked polymer are heat-insulated, thus avoiding deformation or collapsing of these pieces.

4 Claims, 3 Drawing Figures

MOLD APPARATUS

This is a divisional application of our copending patent application Ser. No. 699,829, filed June 25, 1976, now U.S. Pat. No. 4,076,282, which in turn was a divisional application of Ser. No. 599,738, filed July 28, 1975, now U.S. Pat. No. 3,089,787.

This invention relates to plastic articles. In accordance with one aspect, this invention relates to plastic pipe fittings and plastic pipe connections. In accordance with another aspect, this invention relates to methods for making such plastic articles. In accordance with a further aspect, this invention relates to a new mold.

BACKGROUND OF THE INVENTION

Articles with intricate shapes can be formed out of thermoplastic polymer materials. If such articles are to be connected to other units, they have been made out of non-crosslinked plastic polymers and such articles could easily be, for instance, welded to another unit. When a higher degree of mechanical stability or rigidity was desired, such articles were formed out of crosslinkable plastic polymer which was crosslinked during the molding step.

One process which is particularly advantageous for molding intricately shaped articles out of crosslinkable polymers is the rotational molding process. In this process, powder or granules of plastic polymer being crosslinkable and containing a crosslinking agent are introduced into a mold. The closed mold is then heated from the outside and rotated preferably around two axes with different rotational speeds. During this process the polymer fuses and crosslinks, thus forming a layer of crosslinked material on the inner surface of the mold. Sturdy articles with intricate shapes can economically be produced by this process. However, pipe connections or pipe fittings of crosslinked polymers have the serious drawback that they cannot be connected by standard techniques, e.g., welding or adhesive bonding, to other units such as pipes of non-crosslinked polymers or to other crosslinked sections.

THE INVENTION

An object of this invention is to provide a new mold for the formation of a novel plastic article.

Figure 2:
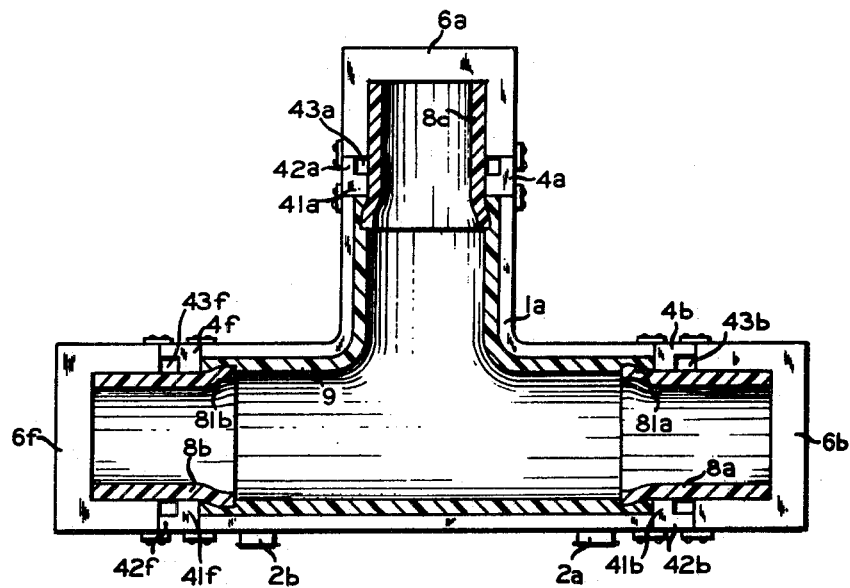
Figure 3:
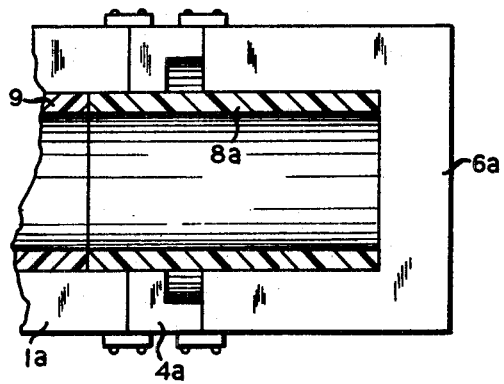

These and other objects, features, advantages, and embodiments of this invention will become apparent to a person skilled in the art from the following detailed description of the invention, the attached claims, and the drawing, in which:

FIG. 1 shows a perspective view of an open mold with a finished pipe tee therein, FIG. 2 shows a cross-section through the mold shown in FIG. 1 along the plane separating the two mold halves at the end of a rotational molding process, and FIG. 3 shows a section of a mold with a butt-type joint in cross-section, as explained in connection with FIG. 2 above.

In accordance with this invention, for a novel mold there is now provided a molded article of a polymeric material, which article consists essentially of a hollow body of crosslinked plastic polymer having bonded thereto at least one conduit of uncrosslinked plastic polymer material. The term "bonded" means a tight, welding-type connection between the non-crosslinked conduit and the crosslinked hollow body; the bond is made by rotationally molding the hollow body from crosslinkable plastic material around one end of each conduit of non-crosslinked material; the crosslinkable plastic material fuses and crosslinks around this end of the conduit producing said tight, welding-type connection.

The article made in the mold of this invention has the advantage of having the strength of the crosslinked polymer in the body section and of being readily connectable by the conduit or conduits of uncrosslinked plastic material employing standard procedures such as welding or adhesive bonding.

The presently preferred plastic article is a pipe fitting having a hollow body of crosslinked polymer, said body opening into at least two pieces of pipe of non-crosslinked plastic polymer. This pipe-connecting piece or pipe fitting can readily be connected to standard plastic pipes, e.g., sewer pipes, by welding the plastic non-crosslinked pieces of pipe to the free ends of the pipe conduits also consisting of non-crosslinked plastic polymer. The body of such pipe fittings or pipe connections oftentimes has to sustain high mechanical stresses. The pipe fitting of this invention will resist such stresses sufficiently, since it is made from crosslinked polymer material. The pipes which are used for the conduits are generally made from non-crosslinked polymer material so that these can be readily attached to the non-crosslinked pipe pieces protruding from the body of the pipe connection. This attachment can be done by well-known welding techniques.

The advantages of the articles made in the novel mold of this invention just described are achieved with any crosslinked body portion and noncrosslinked conduits of plastic materials attached thereto. For practical purposes, it is preferred to employ essentially the same polymer material for the hollow body and for the conduits attached thereto, the only difference being that the hollow body of the combined article is crosslinked, whereas the attached conduits are non-crosslinked. If, however, it is necessary or advantageous to produce a combined article from different plastic materials so that the hollow body consists of a first crosslinked polymer and the attached conduits consist of a second non-crosslinked polymer, this also can be done in accordance with this invention. Such an article is also within the scope of this invention.

Polymers useful for the purposes of this invention both in the non-crosslinked conduits and in the crosslinked hollow body portions are, e.g., polymers or copolymers of 1-olefins having two to eight carbon atoms per molecule, particularly polymers of ethylene, propylene, and butene-1; copolymers of ethylene and butene-1, ethylene and hexene-1, etc. The crosslinkable polymers have been compounded with 0.3-2 weight percent, based on polymers, of a crosslinking agent, and these polymers crosslink during the rotational molding process by which the combined article is produced. Among the crosslinkable polymers, high-density polyethylene having a density between 0.950–0.965 g/cc and a melt index (ASTM D-1238-65T, Condition E) of 10–30 g/10 minutes is presently preferred. The preferred crosslinking agents are acetylenic diperoxy hexynes having the formula

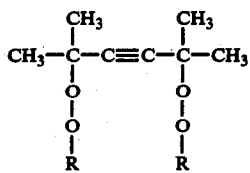

diperoxy octynes having the formula

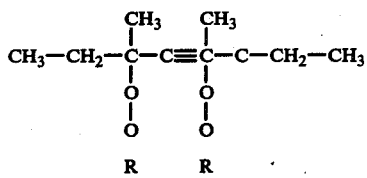

and diperoxy octa-di-ynes having the formula

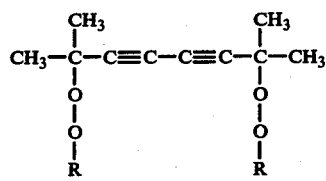

wherein R is a tertiary alkyl, alkyl carbonate, or benzoate radical of four to twelve carbon atoms per R radical. Representative examples for these unsaturated peroxides are the following compounds:

2,7-Dimethyl-2,7-di(t-butylperoxy)octadiyne-3,5
2,7-Dimethyl-2,7-di(peroxy ethyl carbonate)octadiyne-3,5
3,6-Dimethyl-3,6-di(peroxy ethyl carbonate)octyne-4
3,6-Dimethyl-3,6-(t-butylperoxy)octyne-4
2,5-Dimethyl-2,5-di(peroxybenzoate)hexyne-3
2,5-Dimethyl-2,5-di(peroxy-n-propyl carbonate)hexyne-3
2,5-Dimethyl-2,5-di(peroxy isobutyl carbonate)hexyne-3
2,5-Dimethyl-2,5-di(peroxy ethyl carbonate)hexyne-3
2,5-Dimethyl-2,5-di(alpha-cumyl peroxy)hexyne-3
2,5-Dimethyl-2,5-di(peroxy beta-chloroethyl carbonate)hexyne-3
2,5-Dimethyl-2,5-di(t-butylperoxy)hexyne-3.

The non-crosslinked conduits which are connected with the crosslinked hollow body sections preferably consist of noncrosslinked polymers which do not contain liquid plasticizers or processing aids such as glycerine, ethylene glycol, dibutyl phthalate, and the like which are sometimes incorporated into such thermoplastic materials. These agents have the tendency to migrate towards the surface of the non-crosslinked conduits, which can result in a poor connecting strength between the noncrosslinked conduits and the crosslinked hollow body section.

Both the crosslinked thermoplastic polymer and the noncrosslinked thermoplastic polymer can contain further additives such as pigments, filler, antioxidants, and other stabilizers.

In accordance with a further embodiment with respect to the novel mold of this invention, there is provided a process for making a molded plastic article consisting essentially of a hollow body of crosslinked thermoplastic polymer and at least one conduit of non-crosslinked thermoplastic polymer attached thereto.

This process for using the mold of this invention comprises the steps of:

introducing a crosslinkable polymer into a rotational mold comprising a hot section and at least one cool section, placing at least one conduit of non-crosslinked plastic material into said mold in such a manner that a section of said conduit is located inside of said hot section of said mold, during the rotational molding process, that the crosslinkable polymer fuses and is crosslinked around and in contact with said section, that the remainder of said conduit extends into said cool section of said mold to avoid deformation of said conduits during the rotational molding process, heating and rotating said mold, thereby fusing and crosslinking said crosslinkable polymer to form a layer of crosslinked polymer on the walls of said mold and a tight welding-type connection between said layer and said section of said conduit of non-crosslinked polymer, thus forming a composite plastic article, and removing said composite plastic article from said mold.

The terms "hot section" and "cool section" of the mold are to be understood in a relative manner: The hot section of the mold during the heating step becomes sufficiently hot inside to fuse, mold, and crosslink the crosslinkable thermoplastic material. The cool section of the mold, however, does not become hot enough to deform the remainder of the conduit extending into the cool section.

The insulation of the cool section of the mold can be done in various ways depending both upon the nature of the polymer and conduit involved and the process conditions. For example, this section of the conduit to be bonded to the cross-linked polymer body can be insulated by surrounding this conduit with a heat-insulating material such as batt of fiber glass, asbestos, or glass wool optionally covered with metal foil.

In accordance with still another embodiment of this invention there is provided a new mold. This mold comprises a mold body section and means for attaching a conduit to said mold body section and for heat insulating a first portion of said conduit. The mold body section is arranged in an apparatus for rotationally molding a plastic article in such a manner that it can be rotated and heated such as to fuse thermoplastic material contacting the inside surface of the mold body section. The mold body section has at least one opening. The means of attaching and heat insulating a conduit are attached to the mold body section so that a second portion of said conduit protrudes through said opening into said mold body section whereas said first portion is held and heat insulated by said means.

Preferably the means for attaching and heat insulating the conduit is an insulating cap attached to said mold body section and covering said opening. More than one of such means are generally present, and in the case of pipe connections there are at least two, in the case of pipe tees there are three of such means or caps attached to the mold body section.

Further embodiments of this invention will become apparent from the following description of the drawing and the examples.

The perspective view of FIG. 1 shows a mold opened after a finished rotational molding process, whereas FIG. 2 shows a cross-section through the mold at the end of this process along the dividing plane of the two mold halves. The mold consists of two mold halves 1(a) and 1(b), which are connected by hinges 2(a) and 2(b). The mold essentially has the shape to produce a tee-shaped pipe fitting. Connected to the mold pieces 1(a) and 1(b) are six ring halves 4(a), 4(b), 4(c), 4(d), 4(e), and 4(f). These ring halves are attached to the mold sections 1(a) and 1(b), which consists of a metal, for instance, aluminum or steel, by way of half-ring-shaped brackets 5(a), 5(b), 5(c), 5(d), 5(e), and 5(f), respectively, which are bolted to the mold half as well as to the ring halves. Attached to the ring halves 4(a) through 4(f) are six cylindrically shaped half caps 6(a) through 6(f). These half caps are attached to the half rings 4(a) through 4(f) again by half-ring-shaped brackets 7(a) through 7(f), which are bolted to the ring as well as to the insulating half cap.

The half rings 4(a) through 4(f) consist essentially of a first section 41(a) through 41(f) having a smaller internal diameter and a second section 42(a) through 42(f) having a larger internal configuration. The sections 41(a) through 41(f) contact and hold pieces of pipe of non-crosslinked thermoplastic material 8(a) and 8(b). The sections 42(a) through 42(f) form with the pipe pieces 8(a) and 8(b) ring-shaped air gaps 43(a) through 43(f). The half caps 6(a) through 6(f) are made from insulating material, e.g., glass fiber material, and surround the external ends of the plastic pipe pieces 8(a), 8(b), and 8(c). The internal ends of these plastic pipe pieces 8(a), 8(b), and 8(c) protrude from the rings 4(a) through 4(f) into the hot portion of the mold halves 1(a), 1(b). In the embodiment shown in FIGS. 1 and 2, the pieces 8(a), 8(b), and 8(c) of the plastic pipe do not touch the hot section of the mold 1(a) and 1(b). During the rotational molding process, crosslinkable polymer material which is present in the mold is pulverized or granulated form forms a tee-shaped body 9 on the inner surfaces of the mold sections 1(a) and 1(b). The heat, which is externally applied to the mold, does not reach the pipe pieces 8(a), 8(b), and 8(c) because of the insulating half caps 6(a) through 6(f) as well as because of the air channels 43(a) through 43(f). These elements are the cool section of the mold. Thus, the external sections of the plastic pipe pieces 8(a), 8(b), and 8(c) are prevented from softening sufficiently to collapse. The ends of the plastic pipe pieces 8(a), 8(b), and 8(c) protruding into the interior of the hot section of the mold 1(a) and 1(b) are softened somewhat. This causes these ends to flare out somewhat, as shown by the flared ends 81(a) and 81(b) of the plastic pipe pieces in FIG. 2. Both this flaring outwardly and the building up of a rotationally molded wall of the body piece 9 between the flaring end 81(b) and the neighboring walls of the hot section of the mold 1(a) and 1(b) generate a very strong and tight connection between the non-crosslinked pipe pieces 8(a), 8(b), and 8(c) and the crosslinked body piece 9.

FIG. 3 shows a section of a mold similar to that shown in FIG. 2. However, this mold shows a hot mold section 1(a), a ring half 4(a), and an insulating half cap 6(a) (cool mold section), all having the same internal diameter, which in turn is the same as the external diameter of the pipe piece 8(a) of non-crosslinked thermoplastic material. The section 9 formed during the rotational molding process is thus connected with the pipe piece 8(a) in a butt-type joint. The combined thermoplastic article has the same advantages of comprising a very sturdy body section 9 of crosslinked thermoplastic material and a piece attached thereto consisting of non-crosslinked thermoplastic material, which can be easily connected to other units by conventional techniques, such as welding.

EXAMPLE

A rotational mold for a pipe of 4-inch (10.2 cm) external diameter having a length of about 24 inches (62.4 cm) was used. A pipe section about 4 inches (10.2 cm) long was attached to each end of the mold. The pipe pieces had an external diameter of 2.371 inches (3.5 cm). The sections were held in place with a split ring clamp. The pipe sections had been extruded from a carbon black-filled copolymer of about 95 weight percent ethylene and 5 weight percent butene-1. The melt flow in accordance with ASTM D-1238-65 T, Condition F, of the polymer was 1.5 gm/10 min., the density of the polymer in accordance with ASTM D-1505-67 was 0.955. The plastic used was the plastic commercially available under the trademark Marlex M-7000 from Phillips Petroleum Company.

The mold was charged with 2-¼ pounds (1,013 grams) of high density polyethylene having a melt index in accordance with ASTM Method D-1238-65T, Condition E, of 30 gm/10 min., and a density of 0.960 g/cc. The polymer contained about 0.75 weight percent of 2,5-dimethyl-2,5-di(tert-butylperoxy)hexyne-3 as a crosslinking agent. The charge was in powder form obtained from grinding pellets to a size of about 35 mesh. The material filled into the mold is commercially available as Marlex resin CL-100 from Phillips Petroleum Company.

The pipe inserts were internally supported and plugged by a fiberglass plug. The external surfaces of the pipe were protected by a layer of fiberglass insulation wrapped in aluminum foil around these end sections.

The thus prepared mold was placed into a rotational molding apparatus (800–64, McNeil three station molding apparatus) and rotated at 8 rpm on the major axis and 9 rpm on the minor axis at a temperature of about 600° F. (315.5° C.) for 15 minutes. The mold was then cooled to below the solidification temperature of the polymer by spraying water onto the mold while continuing the rotation. Then the mold was opened and the completed piece has a uniform shape and was properly dimensioned for installation in a water system. The internal end of the pipe ends which had been inserted into the mold had belled out slightly and formed a tight seal with the rotationally molded body.

The pipe connection was subjected to a quick burst test. It was found that the pipe failed before the joint failed.

Reasonable variations and modifications which will be apparent to those skilled in the art can be made in this invention without departing from the spirit and scope thereof.

We claim:

1. A mold useful for rotational molding of thermoplastic articles comprising:
   (a) a mold body section which can be rotated and heated such as to fuse thermoplastic material contacting the inside surface of the mold body section and which mold body section has at least one opening, and
   (b) means for attaching at least one conduit to said mold body section at said one opening and for heat-insulating a first portion of said conduit so that a second portion of said conduit of material attached by said means to said mold body section reaches into said heated mold body section and the first portion of said conduit is not sufficiently heated during a rotational molding process to deform said conduit.

2. A mold in accordance with claim 1 wherein:
said mold body section consists essentially of thermally conductive material for heating the inside of the mold body section by contacting the outside of the mold body section with a heating fluid and
wherein said means for attaching and heat-insulating a conduit consists essentially of a heat-insulating cap which is attached to said mold body section covering said opening and to which said conduit can be attached.

3. A mold in accordance with claim 1 wherein said mold body section has at least one cylindrical opening, wherein said attaching means comprise:
 (a) a ring attached to said mold and being shaped to hold said conduit having a first and a second portion, said first portion protruding through said cylindrical hole into said mold body section, and
 (b) a cap of heat-insulating material attached to said ring and surrounding the second portion of said conduit.

4. A mold in accordance with claim 3 wherein said ring has a first and a second section, wherein said first section faces the mold body section and contacts said conduit, wherein said second section of said ring faces the insulating cap and has a larger internal diameter than the first section, such as to form a ring gap between the ring, the conduit, and the insulating cap.

* * * * *